US010086401B2

United States Patent
Chen et al.

(10) Patent No.: US 10,086,401 B2
(45) Date of Patent: Oct. 2, 2018

(54) TRANSPARENT FLAME-RETARDANT THERMAL-INSULATING UV-BLOCKING POLYMER COMPOSITE FILM, PREPARATION METHOD AND USES THEREOF

(71) Applicants: BEIJING UNIVERSITY OF CHEMICAL TECHNOLOGY, Beijing (CN); CHIZHOU ENP TECHNOLOGY CO., LTD., Chizhou, Anhui (CN)

(72) Inventors: Jianfeng Chen, Beijing (CN); Xiaofei Zeng, Beijing (CN); Jiexin Wang, Beijing (CN); Jianbo Sun, Beijing (CN); Xingwei Han, Beijing (CN)

(73) Assignees: BEIJING UNIVERSITY OF CHEMICAL TECHNOLOGY, Beijing (CN); CHIZHOU ENP TECHNOLOGY CO., LTD., Chizhou, Anhui (CN)

( * ) Notice: Subject to any disclaimer, the term of this patent is extended or adjusted under 35 U.S.C. 154(b) by 203 days.

(21) Appl. No.: 15/029,909

(22) PCT Filed: Oct. 15, 2014

(86) PCT No.: PCT/CN2014/088598
§ 371 (c)(1),
(2) Date: Apr. 15, 2016

(87) PCT Pub. No.: WO2015/055115
PCT Pub. Date: Apr. 23, 2015

(65) Prior Publication Data
US 2016/0243583 A1    Aug. 25, 2016

(30) Foreign Application Priority Data
Oct. 16, 2013  (CN) .......................... 2013 1 0484816

(51) Int. Cl.
B05D 1/00      (2006.01)
B32B 27/08     (2006.01)
(Continued)

(52) U.S. Cl.
CPC .............. B05D 1/005 (2013.01); B05D 1/02 (2013.01); B32B 27/08 (2013.01); C08J 7/042 (2013.01);
(Continued)

(58) Field of Classification Search
None
See application file for complete search history.

(56) References Cited

U.S. PATENT DOCUMENTS 5,956,175 A    9/1999  Hojnowski
2004/0185281 A1  9/2004  Suh et al.
(Continued)

FOREIGN PATENT DOCUMENTS

CN    1501861    6/2004
CN    101006023  7/2007
(Continued)

OTHER PUBLICATIONS

Liu et al. ("Organo-modified magnesium hydroxide nano-needle and its polystyrene nanocomposite," Journal of Nanoparticle Research (2007), vol. 9, pp. 669-673).*
(Continued)

*Primary Examiner* — David Sample
*Assistant Examiner* — Nicole T Gugliotta
(74) *Attorney, Agent, or Firm* — Rankin, Hill & Clark LLP (57) ABSTRACT

Disclosed is a transparent, flame-retardant thermally-insulating, UV-blocking polymer composite film, comprising sequentially from the top: a flame retardant layer, a base layer, a thermal insulation layer, and a UV-blocking layer,
(Continued)

having a total film thickness of 1 μm to 500 μm, visible light transmittance greater than 80%, UV light transmittance less than 1%, and near-infrared transmittance less than 10%. Also disclosed is a preparation method for the present transparent, flame retardant thermally-insulating, UV-blocking polymer composite film, the technical processes whereof are simple and easy to execute, involve low production costs, and are suitable for industrial mass production. The present transparent, flame retardant thermally-insulating, UV-blocking polymer composite film can be used on such transparent materials and items as glass, windows, protective films, containers and electronic components, and has applications in such fields as construction, transportation, electronics, aerospace and medicine.

14 Claims, 3 Drawing Sheets (51) Int. Cl.
*B05D 1/02* (2006.01)
*C08J 7/04* (2006.01)
*B05D 5/00* (2006.01)
*B05D 7/00* (2006.01)

(52) U.S. Cl.
CPC .......... *C08J 7/047* (2013.01); *B05D 5/00* (2013.01); *B05D 7/50* (2013.01); *B05D 2201/00* (2013.01); *B05D 2252/10* (2013.01); *B32B 2307/3065* (2013.01); *B32B 2307/412* (2013.01); *B32B 2439/00* (2013.01); *B32B 2457/00* (2013.01); *C08J 2367/02* (2013.01); *C08J 2429/14* (2013.01)

(56) References Cited

U.S. PATENT DOCUMENTS

| | | | | |
|---|---|---|---|---|
| 2006/0154094 A1* | 7/2006 | Kunugihara | ............ | B32B 17/06 428/480 |
| 2010/0075136 A1* | 3/2010 | Song | ............ | B32B 27/34 428/328 |
| 2014/0329942 A1* | 11/2014 | Matsuo | ............ | C08K 5/49 524/117 |
| 2016/0243799 A1* | 8/2016 | Oshima | ............ | B32B 7/12 |

FOREIGN PATENT DOCUMENTS

| | | | | |
|---|---|---|---|---|
| CN | 201144188 | * | 11/2007 | ............ C03C 23/00 |
| CN | 201144188 | | 11/2008 | |
| CN | 201432547 | | 3/2010 | |
| CN | 101891395 A | * | 7/2010 | ............ C03C 17/00 |
| CN | 102625786 | | 8/2012 | |
| CN | 203831896 | | 9/2014 | |
| JP | 2007021998 | | 2/2007 | |

OTHER PUBLICATIONS

International Search Report of PCT/CN2014/088598 dated Jan. 19, 2015, 4 pages (English and Chinese Translations).
Office Action of CN201310484816.1 dated Feb. 3, 2016, 7 pages.
Concise Explanation of Office Action of CN201310484816.1, 1 page.

* cited by examiner

Fig. 7

TRANSPARENT FLAME-RETARDANT THERMAL-INSULATING UV-BLOCKING POLYMER COMPOSITE FILM, PREPARATION METHOD AND USES THEREOF

TECHNICAL FIELD

The present invention relates to a polymer-inorganic nanoparticle synthesized composite film field, in particular to a transparent flame-retardant thermal-insulating UV-blocking high molecular composite film and the method for preparing the same.

BACKGROUND

In recent years, Chinese government pays much more attention on energy saving and has a goal of reducing national energy consumption of 20%. With the successive promulgations of the national energy-saving policies, energy saving has raised an upsurge throughout the whole country.

In the energy-saving upsurge, energy-efficient window film has become the biggest highlight of the new economic growth. Throughout the Chinese window film market, the potential demands for window film are amazing in construction industry, automobile industry and IT products. Therefore, it has important strategic significance to synthesize composite window film by use of the burgeoning organic-inorganic nanoparticle composite technology.

In recent years, our country witnessed economic prosperity and rapid development of the urban construction. All cities were decorated gorgeously and colorfully by splendid modern buildings. However, the development of the urban construction also brought social problems of high energy and resource consumption. Relevant statistics show that currently China's construction energy consumption accounts for 40% of the social energy consumption; the energy consumption of indoor heating and air conditioning refrigeration accounts for about 65% of the construction energy consumption. What is more shocking is that more than 50% of the temperature control energy efficiency brought by heating and air conditioning is lost from building windows having an energy-saving effect that is not ideal. As can be seen, energy-saving remodeling of doors and windows is critical in the energy saving for existing buildings. To this end, it has become an urgent demand for the sustainable development of our country to reduce the high construction energy consumption, which has also become the focus of the current work in our country. Now in many developed European and American countries, in order to improve the energy-saving efficiency of windows and doors, more than 70% of the buildings are subject to energy-saving remodeling with energy-saving window film. This is experience that is worth learning and also provides a rare opportunity for the development of energy-saving glass in our country.

For the time being, the energy-saving window films in the market of our country are mainly dominated by several big foreign brands including V-KOOL, Ray-Ban, 3M, ATI and Johnson. The market lacks products of local independent brands, which provides a broad space for development of the local energy-saving window film in our country and provides impetus for the development of the technology for preparing energy-saving window film.

It is well known that UV ray, as a non-visual ray, has specific lethality and is referred to as "invisible killer" in the scientific community. UV rays, according to the wavelength, can be divided into: UV-A waveband having a wavelength of 320~400 nm, UV-B having a wavelength of 280~320 nm, UV-C having a wavelength of 100~280 nm. UV-C can pass through the dermis. UV-B can enter the dermis. A great part of UV-B can be absorbed by the skin and impair DNA. When DNA is impaired, cells will die or develop into uncontrollable cancer cells. The inducements of many diseases able to be diagnosed currently are related with UV radiation. Since the 1920s, due to the heavy use of fluorocarbon solvents and freon, the atmospheric ozone layer has been seriously damaged, causing the continuous increase of UV rays reaching the earth's surface. For this reason, people spent a great deal of manpower and resources to take effective protective measures against the "invisible killer", researched and developed a variety of anti-UV materials. Multiple UV-blocking materials are currently available on the market. However, the existing UV-blocking materials still have deficiencies such as: a low visible light transmittance, no absorption of infrared region and high processing and production cost and have large space for improvement.

Many UV-blocking films and infrared heat-insulating film materials on the current market are prepared with organic high molecular polymer as the substrate. Thus the film itself also has certain flammability. For the time being, the film material can not only be applied in such transparent materials and items as glass, windows, protective films, containers and electronic components but also widely used in such fields as construction, transportation, electronics, aerospace and medicine. In the specific fields, polymer materials account for a large proportion, so that the flame retardant property of the film material in the fields is particularly important. Moreover, in the traditional application field of the film material (e.g., construction industry and automobile industry), construction materials like glass that are originally non-combustible, after being coated with various functional film products on the surface, are extremely likely to become transmitting media for fire source or flame. Accordingly, it has significant meaning to research and develop a window film incorporating many functions including flame retardance, UV blocking and infrared shielding, which also has broad market prospect.

SUMMARY

The first technical problem to be solved by the present invention is to provide a transparent flame-retardant thermal-insulating UV-blocking high molecular composite film, which has high transparency, good flame retardant effect, excellent thermal-insulating property, and UV-blocking function.

To solve the first technical problem, the present invention adopts the following technical solution:

a transparent flame-retardant thermal-insulating UV-blocking high molecular composite film comprising a flame retardant functional layer, a thermal insulation functional layer, a UV-blocking functional layer and a substrate layer;

Preferably, the high molecular composite film comprises: the flame retardant functional layer, the substrate layer, the thermal insulation functional layer and the UV-blocking functional layer, from top to the bottom.

Preferably, the transparent flame-retardant thermal-insulating UV-blocking high molecular composite film has a thickness of 1 μm~500 μm; preferably, a thickness of 1 μm~300 μm.

Preferably, the transparent flame-retardant thermal-insulating UV-blocking high molecular composite film has a visible light transmittance greater than 80%, UV light transmittance less than 1%, and near-infrared transmittance less than 10%.

Preferably, the flame retardant functional layer is composed of 10~50wt % of an inorganic nanometer flame retardant, 50~70wt % high molecular polymer and 0~20 wt % aids; preferably, the flame retardant functional layer is composed of 30~50 wt % of inorganic nanometer flame retardant, 50~70wt % high molecular polymer and 0~20 wt % plastic aids.

The flame retardant functional layer has a thickness of 100 nm~100 μm; preferably, the inorganic nanometer flame retardant is selected from one or more of nano-magnesium hydroxide, nano-aluminum hydroxide, zinc borate, antimony trioxide and α-molybdenum trioxide; more preferably, the inorganic nanometer flame retardant is selected from nano-magnesium hydroxide or nano-aluminum hydroxide.

Preferably, the inorganic nanometer flame retardant is in shape of cubic, spherical, rod-like, strip-like, needle-like, flake-shaped or sea urchin-shaped; more preferably, the inorganic nanometer flame retardant is flake-shaped.

Preferably, the nano-magnesium hydroxide is prepared by the following steps:

(1) dissolving magnesium salt in water or an organic solvent to obtain a magnesium salt solution; dissolving alkali in water or an organic solvent to obtain lye;

(2) adding the magnesium salt solution and the lye into a high gravity rotating packed bed or a tube-in-tube annular microchannel reactor for reaction; and obtaining a suspension of magnesium hydroxide after the reaction;

(3) adding a surfactant to the suspension of magnesium hydroxide to modify; allowing the modified liquid to stand after the modification;

(4) filtering and washing the modified liquid to obtain the desired nano-magnesium hydroxide particles;

the magnesium salt is selected from one or more of the following substances: magnesium sulfate, magnesium nitrate, magnesium chloride and magnesium acetate;

the magnesium salt solution has a concentration of 1wt %~35wt %;

the organic solvent is selected from one or more of the following substances: methanol, ethanol, ethylene glycol, isopropanol, glycerol, butanol, acetone, butanone, ethyl acetate, butyl acetate, benzene, toluene, xylene, dimethyl sulfoxide and tetrahydrofuran;

the lye is selected from one or more of the following substances: sodium hydroxide solution, potassium hydroxide solution and aqueous ammonia; the sodium hydroxide solution is a solution formed by dissolving sodium hydroxide in water or an organic solvent; the potassium hydroxide solution is a solution formed by dissolving potassium hydroxide in water or an organic solvent; the organic solvent is selected from one or more of the following substances: methanol, ethanol, ethylene glycol, isopropanol, glycerol, butanol, acetone, butanone, ethyl acetate, butyl acetate, benzene, toluene, xylene, dimethylsulfoxide, tetrahydrofuran, n-hexane and cyclohexane;

the lye has a concentration of 1wt %~40wt %; preferably, the lye has a concentration of 1wt %~25wt %;

in step (1), the magnesium salt solution and lye are respectively placed in a storage tank, and the temperature is maintained at 20~70° C.;

in step (2), the reaction temperature is 20~70° C.; more preferably, the reaction temperature is 25~60° C.; most preferably, the reaction temperature is 25~55° C.;

in step (2), the high gravity rotating bed reactor is selected from rotating packed bed (RPB) high gravity rotating bed reactor, baffled high gravity rotating bed reactor, spiral channel high gravity rotating bed reactor, rotor-stator high gravity rotating bed reactor or a high gravity rotating bed reactor with rotating disks; preferably, the rotor speed of the rotating bed is 300~5000rpm; preferably, the rotor speed of the rotating bed is 600~2500rpm;

in step (2), the molar velocity ratio of magnesium salt solution to lye solution introduced into the rotating packed bed is 0.2 to 3.5: 1; preferably, the magnesium salt solution is introduced into the nozzle of the RPB at a linear velocity of 2~7m/s, and lye is at 2~8m/s;

in step (2), in the casing annular microchannel reactor, an outer tube and an inner tube constitute a casing tube; an annular space is formed between the inner tube and the outer tube, which constitutes an annular microchannel; the annular microchannel has a radial spacing of 100 μm~5 mm; the outer tube is equipped with continuous phase inlet and outlet; the inner tube is equipped with a dispersion phase inlet at one end and is closed at the other end; and the closed end is in the shape of cone or bullet; the tube wall of the columnar inner tube adjacent to the closed end is circumferentially covered with micropores having a pore size in the range of 0.05 to 100 μm; the tube wall of the columnar inner tube has an aperture ratio of 3% to 60%; the micropores on the inner tube are the dispersion phase outlets;

in step (2), the volume flow ratio of the magnesium salt solution to lye introduced into the casing annular microchannel reactor is (0.5~10):1;

in step (2), the flow of the magnesium salt solution introduced into the outer tube of the casing annular microchannel reactor is 1~6 L/min, the flow of the lye introduced into the inner tube of the casing annular microchannel reactor is 0.2~2 L/min;

in step (2), a plurality of casing annular microchannel reactors are connected in parallel;

in step (2), centrifugal pump, peristaltic pump or metering pump provided with a flowmeter is adopted to adjust the injection rate of the reaction solution;

in step (3), the surfactant is selected from one ore more of the following substances: cetyl trimethyl ammonium bromide, sodium lauryl sulfate, sodium oleate, polyvinylpyrrolidone, polyethylene glycol, γ-aminopropyl triethoxysilane, γ-glycidoxypropyl trimethoxy silane, γ-methacryloxypropyl trimethoxy silane, N-(β-aminoethyl)-γ-aminopropyltrimethoxysilane, N-(β-aminoethyl)-γ-aminopropyltriethoxysilane, N-β-(aminoethyl)-γ-aminopropyl dimethoxy silane, oleic acid, stearic acid, zinc stearate, sodium stearate, titanate and polyvinyl alcohol;

in step (3), the modification is carried out in a modification tank, where the modification temperature is 30~95° C., the modification time is 0.5~5h; preferably, the modification temperature is 40~90° C., the modification time is 1~4h; most preferably, the modification temperature is 50~80° C., the modification time is 1.5~4h;

in step (3), the mass fraction of the surfactant-coated layer accounts for 1%~40% of the modified magnesium hydroxide particles; preferably, the mass fraction of the surfactant-coated layer accounts for 2%~30% of the modified magnesium hydroxide particles; most preferably, the mass fraction of the surfactant-coated layer accounts for 5%~25% of the modified magnesium hydroxide particles;

in step (3), the standing time is 0.5~5h;

preferably, the preparation method of the nano-aluminium hydroxide is similar to the preparation method of nano-magnesium hydroxide;

preferably the thermal insulation functional layer is composed of 5~50wt % near-infrared absorbing agent or heat shielding agent, 60~80wt % high molecular polymer and 0~35wt % aid; the thermal insulation functional layer has a thickness of 100nm~150μm; preferably, the near-infrared absorbing agent or heat shielding agent is selected from one or more of nano-indium tin oxide, nano-tin antimony oxide, nano-tungsten oxide, various tungsten bronzes or lanthanum hexaboride;

preferably, the near-infrared absorbing agent or heat shielding agent is cubic, spherical, rod-like, strip-like, needle-like, flake-shaped or sea urchin-shaped; more preferably, the near-infrared absorbing agent or heat shielding agent is cubic or spherical;

preferably the UV-blocking functional layer is composed of 4~60 wt % inorganic nano-UV absorbing agent, 40~96 wt % high molecular polymer and 0~30 wt % aid; the UV-blocking functional layer has a thickness of 100 nm~50 μm;

preferably, the inorganic nano-UV absorbing agent is selected from one of nano-zinc oxide, nano-titanium dioxide, nano-cerium oxide, doped nano-zinc oxide, doped nano-titanium dioxide and silica-coated core-shell composite metal oxide nanoparticle with any one of the above nanoparticles as the core or the mixture of more of them; more preferably, the inorganic nano-UV absorbing agent is selected from silica-coated nano-zinc oxide;

preferably, the inorganic nano-UV absorbing agent is cubic, spherical, rod-like, strip-like, needle-like, flake-shaped or sea urchin-shaped; more preferably, the inorganic nano-UV absorbing agent is cubic or spherical;

preferably, the high molecular polymer is selected from any one of polyvinyl butyral (PVB), polyvinyl pyrrolidone (PVP), polyacrylate polymer, polysiloxane polymer, polyurethane polymer, polyterephthalate polymer, polystyrene (PS) and polycarbonate (PC) or the copolymer or blend of more of them;

preferably, the high molecular polymer of the flame retardant functional layer is selected from polysiloxane polymer; more preferably, the high molecular polymer of the flame retardant functional layer is selected from one of polydimethylsiloxane and polytrimethylene terephthalate (PPT);

preferably, the aid is selected from one or more of diethyl phthalate, dioctyl phthalate, dibutyl phthalate, tributyl phosphate, triphenyl phosphate, tricresyl phosphate, dibutyl sebacate, acrylate copolymer, a non-reactive modified polysiloxane, H88, ethylene glycol butyl ether, diethylene glycol di-n-butyl ether, polyether-modified polysiloxane wetting agent, organosilicone defoamer, polyether defoamer, polyvinylpyrrolidone, various types of ionic surfactants, fatty alcohol polyoxyethylene ether, steartrimonium chloride, N,N-bi-hydroxyethyl-N-(3'dodecyloxy-2'-hydroxypropyl) methylamine methyl sulfate, stearamidopropyl-β-ethoxyl-dimethyl ammonium nitrate, stearhydroxylamine propyl-β-hydroxyethyl-dimethyl triammonium hydrogen phosphate, ethyoxyl lauramide, glycerine-stearate, sodium dithiocarbamate, sodium dodecyl sulfonate.

The second technical problem to be solved by the present invention is to provide a preparation method for the transparent flame retardant thermal-insulating UV-blocking high molecular composite film. The technical processes thereof, which are simple and easy to execute, involve low production costs, and are suitable for industrial mass production, have important social and economic value and broad market prospect.

To solve the second technical problem, the present invention adopts the following technical solution:

a method for preparing a transparent flame-retardant thermal-insulating UV-blocking high molecular composite film, comprising the following preparation steps:

(1) dispersing the functional nanoparticles of each functional layer into a proper dispersion medium to form a uniform transparent dispersion; uniformly mixing the transparent dispersion with high molecular polymer and aid or the solution thereof at a certain concentration to give the film-forming primary liquid of each functional layer.

(2) coating the flame retardant functional layer obtained from step (1) onto the substrate by use of knife coating, transfer printing, spray coating, impregnation, roller painting, spin coating, extrusion molding or calendaring molding; then curing at 80~150° C. or under UV light's irradiation.

(3) coating the film-forming primary liquid of the thermal insulation functional layer obtained from step (1) onto the other side of the substrate in step (2) by use of knife coating, transfer printing, spray coating, impregnation, roller painting, spin coating, extrusion molding or calendaring molding; then curing at 80~150° C. or under UV light's irradiation.

(4) coating the film-forming primary liquid of the UV-blocking functional layer obtained from step (1) onto the thermal insulation functional layer obtained in step (3) by use of knife coating, transfer printing, spray coating, impregnation, roller painting, spin coating, extrusion molding or calendaring molding; then curing at 80~150° C. or under UV light's irradiation to obtain the product a transparent flame-retardant thermal-insulating UV-blocking high molecular composite film.

preferably, the dispersion medium in step (1) is one of water, methanol, ethanol, n-heptane, n-hexane, cyclohexane, toluene, xylene, ethyl acetate or butyl acetate or a mixture of more of them;

preferably, the transparent polymer film substrate is selected from one of polyethylene terephthalate (PET), polycarbonate (PC), polystyrene (PS), polyethylene (PE), polypropylene (PP) and polyvinyl chloride (PVC).

The third technical problem to be solved by the present invention is to provide a use of the transparent flame retardant thermal-insulating UV-blocking high molecular composite film. The transparent flame-retardant thermal-insulating UV-blocking high molecular composite film provided in the present invention can be used on such transparent materials and items as glass, windows, protective films, containers and electronic components, and has applications in such fields as construction, transportation, electronics, aerospace and medicine.

The beneficial effects of the present application are that the transparent flame retardant thermal-insulating UV-blocking high molecular composite film of the present invention has a visible light transmittance greater than 80%, a UV light transmittance less than 1% and a near-infrared transmittance less than 10%, shows remarkable energy-saving effect and has excellent flame retardant ability.

The high molecular polymer in the flame retardant functional layer of the transparent flame retardant thermal-insulating UV-blocking high molecular composite film of the present invention is preferably polysiloxane resin, which can impart self-cleaning ability to the transparent flame retardant thermal-insulating UV-blocking high molecular composite film. The technical processes of the transparent flame retardant thermal-insulating UV-blocking high molecular composite film of the present invention are simple and easy to execute, involve low production costs, and are suitable for industrial mass production.

The transparent flame retardant thermal-insulating UV-blocking high molecular composite film of the present invention can be applied in many fields including human life, work, transportation, adventure, space engineering, display and special projects.

DETAILED DESCRIPTION

Figure 1:
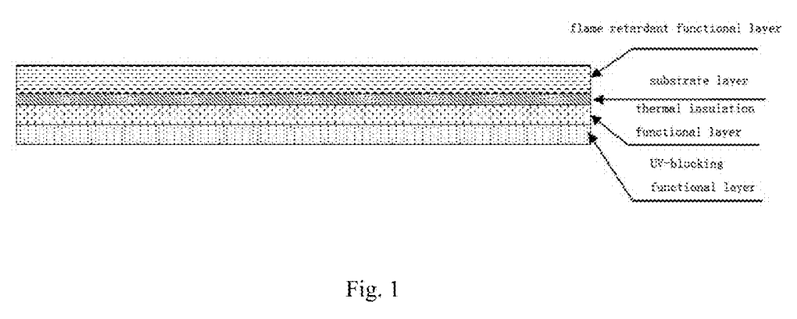
FIG. 1 is the structure diagram of the transparent flame retardant thermal-insulating UV-blocking high molecular composite film of the present invention.
Figure 2:
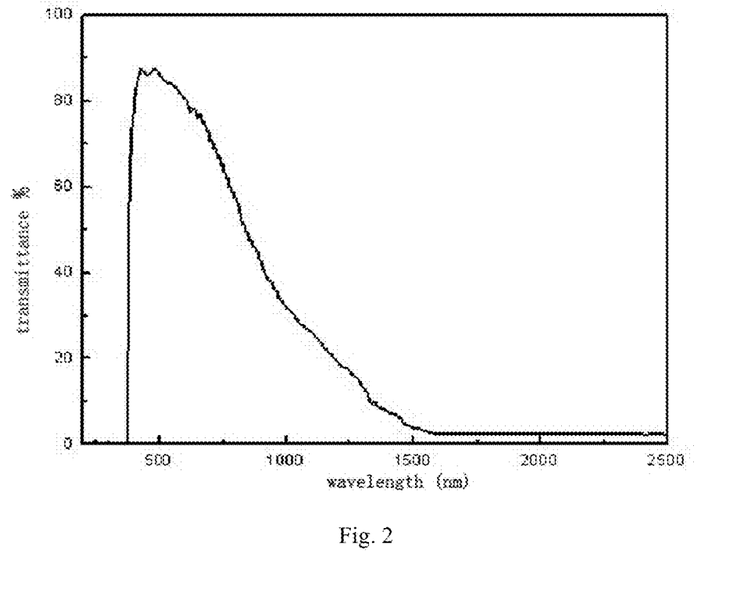
FIG. 2 is the UV-Vis-NIR spectrogram of the transparent flame retardant thermal-insulating UV-blocking high molecular composite film prepared in Example 8 of the present invention.
Figure 3:
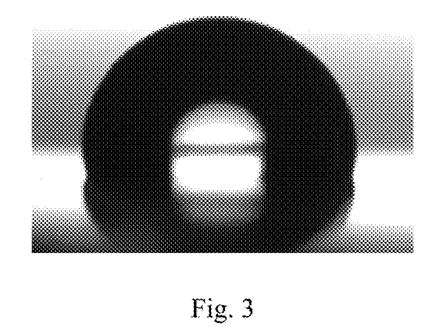
FIG. 3 is the schematic diagram of the contact angle of the flame retardant functional layer of the transparent flame retardant thermal-insulating UV-blocking high molecular composite film prepared in Example 7 of the present invention, wherein the contact angle of the flame retardant functional layer CA=117.8±2°.
Figure 4:
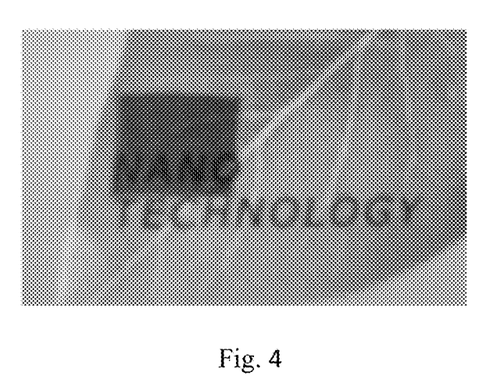
FIG. 4 is the actual photo of the high molecular composite film prepared in Example 8 of the present invention.
Figure 5:
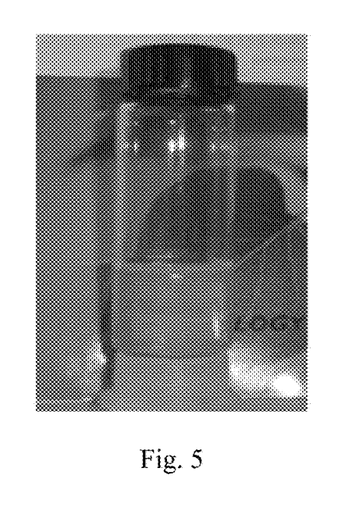
FIG. 5 is the actual photo of the dispersion containing $Mg(OH)_2$ nanoparticles in Example 1 of the present invention.
Figure 6:
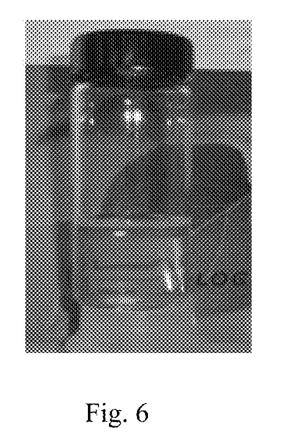
FIG. 6 is the actual photo of the dispersion containing ZnO nanoparticles in Example 1 of the present invention.
Figure 7:
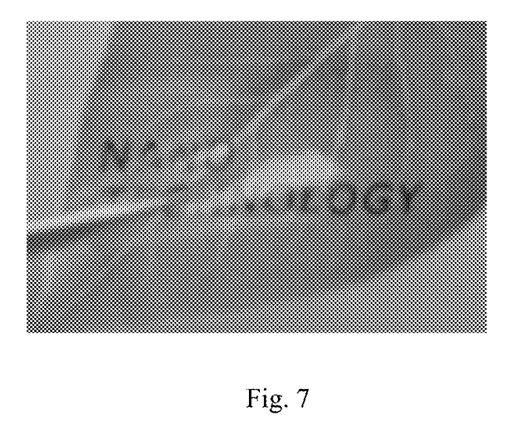
FIG. 7 is the actual photo of the high molecular composite film prepared in Example 9 of the present invention.

ZnO, ITO, ATO and $LaB_6$ used in the present invention are commercially available products. H88 is a commercially available product, for example produced by Hubei Laisi New Chemical Materials Co., Ltd. Various tungsten bronze particles are synthesized according to the following documents:

Chongshen Guo, Shu Yin, Lijun Huang, Lu Yang and Tsugio Sato. Discovery of an excellent IR absorbent with a broad working waveband: $Cs_xWO_3$ nanorods. Chem. Commun., 2011, 47, 8853-8855.

Chongshen Guo, Shu Yin, Qaing Dong and Tsugio Sato. Near-infrared absorption properties of $Rb_xWO_3$ nanoparticles. Cryst. Eng. Commun., 2012, 14, 7727-7732.

Chongshen Guo, Shu Yin, Qaing Dong and Tsugio Sato. The near-infrared absorption properties of $W18O49$. RSC. Advances., 2012, 2, 5041-5043.

Lingxiao Liu, XiaoLi Dong, Xiangwen Liu, Fei Shi and Tsugio Sato. Solvothermal synthesis an characterization of tungsten oxides with controllable morphology and crystal phase. J. Alloy. Compd., 2011, 509, 1482-1488.

Chongshen Guo, Shu Yin, and Tsugio Sato. Effects of crystallization atmosphere on the near-infrared absorbtion and electroconductive properties of tungsten bronze type $MxWO3(M=Na,K)$. J. Am. Ceram. Soc., 95, 1634-1639.

Chongshen Guo, Shu Yin, Lijun Huang and Tsugio Sato. Synthesis of one-dimensional potassium tungsten bronze with excellent near-infrared absorption property. ACS Appl. Mater. Interfaces., 2011, 3, 2794-2799.

Chongshen Guo, Shu Yin, Yunfang Huang, Qaing Dong and Tsugio Sato. Synthesis of $W18O49$ nanorod via ammonium tungsten oxide and its interasting optical properties. Langmuir. 2011,27,12172-12178.

Hiromitsu Takeda and Kenji Adachi. Near-infrared absoption of tungsten oxide nanoparticle dispertions., J. Am. Ceram. Soc., 2007, 90, 2059-2061.

A UV-Visible spectrophotometer of UV-2501 type is used to measure the optical properties of the film prepared in the present invention.

An oxygen index tester of JF-3 type is used to test the flame retardant properties of the film material.

EXAMPLE 1

(1) dispersing the nanoparticles of nano-magnesium hydroxide ($Mg(OH)_2$) into toluene to form an $Mg(OH)_2$-containing transparent dispersion; uniformly mixing the above $Mg(OH)_2$-containing transparent dispersion with PDMS and aid or the solution thereof at a certain concentration to give the film-forming primary liquid, wherein the mass ratio of $Mg(OH)_2$ to PDMS was about 30:70;

dispersing nano-indium tin oxide (ITO) into an appropriate amount of ethanol to form an ITO-containing transparent dispersion; fully uniformly stirring the above ITO-containing transparent dispersion with polyvinyl butyral (PVB) and aid to give the film-forming primary liquid of the thermal insulation functional layer, wherein the mass ratio of all the major components was ITO:PVB:aid=5:75:20.

dispersing the ZnO nanoparticles into an appropriate amount of ethanol to form a transparent dispersion containing ZnO nanoparticles; fully mixing the transparent dispersion containing ZnO nanoparticles with polyvinyl butyral (PVB) to obtain the film-forming primary liquid of the UV-blocking functional layer, wherein ZnO:PVB in the film-forming primary liquid was about 5:95.

(2) coating the film-forming primary liquid of the flame retardant functional layer obtained from step (1) onto the PET substrate by use of spin coating; then curing at 80□;

(3) coating the film-forming primary liquid of the thermal insulation functional layer obtained from step (1) onto the other side of the substrate in step (2) by use of spin coating; then curing at 80□;

(4) coating the film-forming primary liquid of the UV-blocking functional layer obtained from step (1) onto the thermal insulation functional layer obtained in step (3) by use of spin coating; then curing at 80□ to obtain the product transparent flame retardant thermal-insulating UV-blocking high molecular composite film. For the properties thereof, please see Table 1.

EXAMPLE 2

(1) dispersing 30 parts nano-aluminium hydroxide ($Al(OH)_3$) into toluene to form an $Al(OH)_3$-containing transparent dispersion; uniformly mixing the above $Al(OH)_3$-containing transparent dispersion with PDMS and an appropriate amount of aid to give the film-forming primary liquid, wherein the mass ratio of $Al(OH)_3$ to PDMS was about 30:70;

dispersing $LaB_6$ nanoparticles into an appropriate amount of ethanol to form a transparent dispersion containing $LaB_6$ nanoparticles; uniformly mixing the transparent dispersion containing $LaB_6$ nanoparticles with polyvinyl butyral (PVB) and aid to give the film-forming primary liquid of the thermal insulation functional layer, wherein the mass ratio of all the major components was $LaB_6$:PVB:aid=5:75:20;

dispersing ZnO nanoparticles into an appropriate amount of ethanol to form a transparent dispersion containing ZnO nanoparticles; uniformly mixing the transparent dispersion containing ZnO nanoparticles with PVB to give the film-forming primary liquid of the UV-blocking functional layer, wherein the mass ratio of ZnO to PVB was about 5:95;

(2) coating the film-forming primary liquid of the flame retardant functional layer obtained from step (1) onto the PET substrate by use of spray coating; then curing at 80□;

(3) coating the film-forming primary liquid of the thermal insulation functional layer obtained from step (1) onto the other side of the substrate in step (2) by use of spray coating; then curing at 80□;

(6) coating the film-forming primary liquid of the UV-blocking functional layer obtained from step (1) onto the thermal insulation functional layer obtained in step (3) by use of spray coating; then curing at 80□ to obtain the product transparent flame retardant thermal-insulating UV-blocking high molecular composite film. For the properties thereof, please see Table 1.

EXAMPLE 3

(1) dispersing $Mg(OH)_2$ nanoparticles into toluene to form an $Mg(OH)_2$-containing transparent dispersion; uniformly mixing the $Mg(OH)_2$-containing transparent dispersion with polytrimethylene terephthalate and aid to give the film-forming primary liquid of the flame retardant functional layer, wherein the mass ratio of $Mg(OH)_2$ to PDMS was about 40:60;

dispersing the mixture of ITO and ATO (ITO:ATO=w1: w2=1:1) into an appropriate amount of ethanol to form a transparent dispersion containing nanoparticles of ITO and ATO; uniformly mixing the transparent dispersion containing nanoparticles of ITO and ATO with PVB and an appropriate amount of aid to give the film-forming primary liquid of the thermal insulation functional layer, wherein the mass ratio of all the major components was (ITO and ATO):PVB: aid=5:75:20;

dispersing ZnO nanoparticles into a certain amount of ethanol to form a transparent dispersion containing ZnO nanoparticles; uniformly mixing the transparent dispersion containing ZnO nanoparticles with PVB to give the film-forming primary liquid of the UV-blocking functional layer, wherein the mass ratio of ZnO to PVB was about 5:95;

(2) coating the film-forming primary liquid of the flame retardant functional layer obtained from step (1) onto the PET substrate by use of knife coating; then curing at 80□;

(3) coating the film-forming primary liquid of the thermal insulation functional layer obtained from step (1) onto the other side of the substrate in step (2) by use of knife coating; then curing at 80□;

(4) coating the film-forming primary liquid of the UV-blocking functional layer obtained from step (1) onto the thermal insulation functional layer obtained in step (3) by use of knife coating; then curing at 80□ to obtain the product transparent flame retardant thermal-insulating UV-blocking high molecular composite film. For the properties thereof, please see Table 1.

EXAMPLE 4

(1) dispersing $Mg(OH)_2$ nanoparticles into toluene to form an $Mg(OH)_2$-containing transparent dispersion; uniformly mixing the above obtained $Mg(OH)_2$-containing transparent dispersion with polytrimethylene terephthalate (PPT) and an appropriate amount of aid to give the film-forming primary liquid of the flame retardant functional layer, wherein the mass ratio of $Mg(OH)_2$ to PPT was about 30:70;

dispersing the $K_xWO_3$ nanoparticles into an appropriate amount of ethanol to form a transparent dispersion containing $LaB_6$ nanoparticles; fully uniformly stirring the transparent dispersion containing $K_xWO_3$ nanoparticles with PVB and an appropriate amount of aid to give the film-forming primary liquid of the thermal insulation functional layer, wherein the mass ratio of all the major components was $K_xWO_3$: PVB: aid=5:75:20;

dispersing ZnO nanoparticles into a certain amount of ethanol to form a transparent dispersion containing ZnO nanoparticles; uniformly mixing the transparent dispersion containing ZnO nanoparticles with PVB to give the film-forming primary liquid of the UV-blocking functional layer, wherein the mass ratio of ZnO to PVB was about 5:95;

(2) coating the film-forming primary liquid of the flame retardant functional layer obtained from step (1) onto the PET substrate by use of spin coating; then curing under UV light's irradiation;

(3) coating the film-forming primary liquid of the thermal insulation functional layer obtained from step (1) onto the other side of the substrate in step (2) by use of spin coating; then curing under UV light's irradiation;

(4) coating the film-forming primary liquid of the UV-blocking functional layer obtained from step (1) onto the thermal insulation functional layer obtained in step (3) by use of spin coating; then curing under UV light's irradiation to obtain the product transparent flame retardant thermal-insulating UV-blocking high molecular composite film. For the properties thereof, please see Table 1.

EXAMPLE 5

(1) dispersing $Al(OH)_3$ into an appropriate amount of toluene to form an $Al(OH)_3$-containing transparent dispersion; adding an appropriate amount of PPT and aid to the $Al(OH)_3$-containing transparent dispersion; uniformly stirring and mixing to obtain the film-forming primary liquid of the flame retardant functional layer, wherein the mass ratio of $Al(OH)_3$, PPT and aid was about 28:70:2;

dispersing nano-indium tin oxide ITO into an appropriate amount of ethanol to form an ITO-containing transparent dispersion; uniformly mixing the above ITO-containing transparent dispersion with polyvinyl butyral (PVB) and aid to give the film-forming primary liquid of the thermal insulation functional layer, wherein the mass ratio of all the major components was ITO:PVB:aid=5:75:20;

dispersing ZnO nanoparticles into an appropriate amount of ethanol to form a transparent dispersion containing ZnO nanoparticles; uniformly mixing the transparent dispersion containing ZnO nanoparticles with PVB to give the film-forming primary liquid of the UV-blocking functional layer, wherein the ZnO:PVB in the film-forming primary liquid was about 5:95;

(2) coating the film-forming primary liquid of the flame retardant functional layer obtained from step (1) onto the PET substrate by use of spray coating; then curing under UV light's irradiation;

(3) coating the film-forming primary liquid of the thermal insulation functional layer obtained from step (1) onto the other side of the substrate in step (2) by use of spray coating; then curing under UV light's irradiation;

(4) coating the film-forming primary liquid of the UV-blocking functional layer obtained from step (1) onto the thermal insulation functional layer obtained in step (3) by use of spray coating; then curing under UV light's irradiation to obtain the product transparent flame retardant thermal-insulating UV-blocking high molecular composite film. For the properties thereof, please see Table 1.

EXAMPLE 6

(1) dispersing $Mg(OH)_2$ nanoparticles into toluene to form an $Mg(OH)_2$-containing transparent dispersion; fully mixing the above transparent dispersion with polytrimethylene terephthalate to obtain the film-forming primary liquid, wherein the mass ratio of $Mg(OH)_2$ to PPT was about 30:70;

dispersing nano-indium tin oxide (ITO) into an appropriate amount of ethanol to form an ITO-containing transparent dispersion; fully uniformly mixing the above ITO-containing transparent dispersion with polyvinyl butyral PVB and an appropriate amount of aid to give the film-forming primary liquid of the thermal insulation functional layer, wherein the mass ratio of all the major components was ITO:PVB:aid=25:65:10;

dispersing ZnO nanoparticles into a certain amount of ethanol to form a transparent dispersion containing ZnO nanoparticles; fully uniformly mixing the transparent dispersion containing ZnO nanoparticles with PVB to give the film-forming primary liquid of the UV-blocking functional layer, wherein the mass ratio of ZnO:PVB was about 20:80;

(2) coating the film-forming primary liquid of the flame retardant functional layer obtained from step (1) onto the PET substrate by use of calendering; then curing at 80□;

(3) coating the film-forming primary liquid of the thermal insulation functional layer obtained from step (1) onto the other side of the substrate in step (2) by use of calendering; then curing at 80□;

(4) coating the film-forming primary liquid of the UV-blocking functional layer obtained from step (1) onto the thermal insulation functional layer obtained in step (3) by use of calendering; then curing at 80□ to obtain the product transparent flame retardant thermal-insulating UV-blocking high molecular composite film. For the properties thereof, please see Table 1.

EXAMPLE 7

(1) dispersing $Mg(OH)_2$ nanoparticles into toluene to form an $Mg(OH)_2$-containing transparent dispersion; fully uniformly mixing the above transparent dispersion with polytrimethylene terephthalate (PPT) and an appropriate amount of aid to obtain the film-forming primary liquid, wherein the mass ratio of $Mg(OH)_2$ to PPT was about 40:60;

dispersing nano-indium tin oxide (ITO) into an appropriate amount of ethanol to form an ITO-containing transparent dispersion; adding polyvinyl butyral (PVB) and aid to the above ITO-containing transparent dispersion; fully stirring and uniformly mixing to give the film-forming primary liquid of the thermal insulation functional layer, wherein the mass ratio of all the major components was ITO:PVB:aid=35:55:10;

dispersing ZnO nanoparticles into a certain amount of ethanol to form a dispersion containing ZnO nanoparticles; uniformly mixing the transparent dispersion containing ZnO nanoparticles with PVB to give the film-forming primary liquid of the UV-blocking functional layer;

(2) coating the film-forming primary liquid of the flame retardant functional layer obtained from step (1) onto the PET substrate by use of roller painting; then curing at 80□;

(3) coating the film-forming primary liquid of the thermal insulation functional layer obtained from step (1) onto the other side of the substrate in step (2) by use of roller painting; then curing at 80□;

(4) coating the film-forming primary liquid of the UV-blocking functional layer obtained from step (1) onto the thermal insulation functional layer obtained in step (3) by use of roller painting; then curing at 80□ to obtain the product transparent flame retardant thermal-insulating UV-blocking high molecular composite film. For the properties thereof, please see Table 1.

EXAMPLE 8

(1) dispersing $Al(OH)_3$ into an appropriate amount of butyl acetate to form an $Al(OH)_3$-containing transparent dispersion; adding an appropriate amount of PPT and an appropriate amount of aid to the $Al(OH)_3$-containing transparent dispersion; uniformly mixing to obtain the film-forming primary liquid of the flame retardant functional layer, wherein the mass ratio of $Al(OH)_3$, PPT and aid was about 38:60:2;

dispersing the mixture of the nanoparticles of ITO, ATO and $WO_3$ into an appropriate amount of ethanol, wherein the mass ratio of ITO:ATO:$WO_3$ was 1.5:1.5:2, to form an transparent dispersion containing the nanoparticles of ITO, ATO and $WO_3$; adding a certain proportion of PVB and aid to the transparent dispersion containing the above nanoparticles; uniformly mixing to give the film-forming primary liquid of the thermal insulation functional layer, wherein the mass ratio of all the major components was (ITO, ATO, $WO_3$):PVB:aid=5:75:20;

dispersing ZnO nanoparticles into an appropriate amount of ethanol to form a dispersion containing ZnO nanoparticles; fully uniformly mixing the transparent dispersion containing ZnO nanoparticles with PVB to give the film-forming primary liquid of the UV-blocking functional layer, wherein the mass ratio of all components was ZnO:PVB=10:90;

(2) coating the film-forming primary liquid of the flame retardant functional layer obtained from step (1) onto the PET substrate by use of extrusion molding; then curing at 80□;

(3) coating the film-forming primary liquid of the thermal insulation functional layer obtained from step (1) onto the other side of the substrate in step (4) by use of extrusion molding; then curing at 80□;

(4) coating the film-forming primary liquid of the UV-blocking functional layer obtained from step (1) onto the thermal insulation functional layer obtained in step (3) by use of extrusion molding; then curing at 80□ to obtain the product transparent flame retardant thermal-insulating UV-blocking high molecular composite film. For the properties thereof, please see Table 1.

TABLE 1

The properties of the transparent flame retardant thermal-insulating UV-blocking high molecular composite film prepared in Examples 1-8

| | UV light transmittance % 350 nm | visible light transmittance % 550 nm | near-infrared transmittance % 1700 nm | limiting oxygen index |
|---|---|---|---|---|
| Example 1 | 0.5624 | 86.23 | 8.302 | 34 |
| Example 2 | 0.5524 | 87.03 | 7.203 | 33.8 |
| Example 3 | 0.5438 | 86.3 | 7.147 | 35.2 |
| Example 4 | 0.5019 | 85.7 | 2.057 | 50.1 |
| Example 5 | 0.3014 | 85.9 | 8.314 | 48.4 |
| Example 6 | 0.0396 | 86.21 | 7.958 | 48.6 |
| Example 7 | 0.4589 | 84.71 | 5.634 | 37.2 |
| Example 8 | 0.0409 | 84.14 | 3.766 | 34.3 |

EXAMPLES 9-15

Repeating Example 4, wherein the difference only lay in that: the near-infrared absorbing agent or heat shielding agent was respectively potassium tungsten bronze ($K_xWO_3$), cesium tungsten bronze ($Cs_xWO_3$), rubidium tungsten bronze ($Rb_xWO_3$), potassium cesium tungsten bronze ($K_xCs_yWO_3$), ammonium tungsten bronze ($(NH_4)_xWO_3$), nano-tungsten oxide ($WO_3$) or lanthanum hexaboride ($LaB_6$).

EXAMPLES 16-17

Repeating Example 4, wherein the difference only lay in that: the inorganic nano-UV absorbing agent was respectively silica-coated nano-zinc oxide (ZnO), nano-titanium dioxide ($TiO_2$).

EXAMPLES 18-23

Repeating Example 4, wherein the difference only lay in that: the high molecular polymer was respectively polyvinyl butyral (PVB), polyvinyl pyrrolidone (PVP), polystyrene (PS), polycarbonate (PC), polyethylene terephthalate (PET) or polyurethane (PU).

EXAMPLES 24-29

Repeating Example 4, wherein the difference only lay in that: the plastic aid was respectively dioctyl phthalate (DOP), dibutyl sebacate (DBS), H88 leveling agent, polyoxyethylene oxypropylene glycerol (GPE), triethylene glycol di-2-ethylhexanoate (3G8) or photoinitiator 184.

Obviously, the above-described examples of the present invention are only examples given to clearly illustrate the present invention, rather than limitations on the embodiment of the present invention. For those skilled, changes or variations in other forms may also be made on the basis of the above descriptions. Here we cannot enumerate all the embodiments. Any apparent change or variation extended from the technical solutions of the present invention is still within the protection scope of the present invention.

The invention claimed is:

1. A transparent flame-retardant thermal-insulating UV-blocking composite film, comprising a flame retardant functional layer, a substrate layer, a thermal insulation functional layer and a UV-blocking functional layer and a substrate layer from top to the bottom, wherein
   the flame retardant functional layer comprises 10~50 wt % of an inorganic flame retardant, 50~70 wt % polymer and 0~20 wt % aids,
   the inorganic flame retardant is selected from one or more of magnesium hydroxide particle, aluminum hydroxide particle, zinc borate, antimony trioxide and α-molybdenum trioxide, and
   the polymer of the flame retardant functional layer is selected from one of polydimethylsiloxane and polytrimethylene terephthalate.

2. A transparent flame-retardant thermal-insulating UV-blocking composite film according to claim 1, wherein,
   the transparent flame-retardant thermal-insulating UV-blocking composite film has a thickness of 1 μm~500 μm.

3. A transparent flame-retardant thermal-insulating UV-blocking composite film according to claim 1, wherein, the flame retardant functional layer has a thickness of 100 nm~100 μm;
   the inorganic flame retardant is in shape of cubic, spherical, rod-like, strip-like, needle-like, flake-shaped or sea urchin-shaped;
   the magnesium hydroxide particle of the inorganic flame retardant is prepared by the following steps:

(1) dissolving magnesium salt in water or an organic solvent to obtain a magnesium salt solution; dissolving alkali in water or an organic solvent to obtain lye;
(2) adding the magnesium salt solution and the lye into a molecular mixing enhanced reactor (characterized in that: the molecular mixing characteristic time is less than the nucleation induction time), into a high gravity rotating packed bed or a microchannel reactor for reaction; and obtaining a suspension of magnesium hydroxide after the reaction;
(3) adding a surfactant to the suspension of magnesium hydroxide to modify; allowing the modified liquid to stand after the modification;
(4) filtering and washing the modified liquid to obtain the desired magnesium hydroxide particles;
the magnesium salt is selected from one or more of the following substances: magnesium sulfate, magnesium nitrate, magnesium chloride and magnesium acetate;
the magnesium salt solution has a concentration of 1 wt %~35 wt %;
the organic solvent is selected from one or more of the following substances: methanol, ethanol, ethylene glycol, isopropanol, glycerol, butanol, acetone, butanone, ethyl acetate, butyl acetate, benzene, toluene, xylene, dimethyl sulfoxide and tetrahydrofuran;
the lye is selected from one or more of the following substances: sodium hydroxide solution, potassium hydroxide solution and aqueous ammonia; the sodium hydroxide solution is a solution formed by dissolving sodium hydroxide in water or an organic solvent;
the potassium hydroxide solution is a solution formed by dissolving potassium hydroxide in water or an organic solvent; the organic solvent is selected from one or more of the following substances: methanol, ethanol, ethylene glycol, isopropanol, glycerol, butanol, acetone, butanone, ethyl acetate, butyl acetate, benzene, toluene, xylene, dimethylsulfoxide, tetrahydrofuran, n-hexane and cyclohexane;
the lye has a concentration of 1 wt %~40 wt %;
in step (1), the magnesium salt solution and lye are respectively placed in a storage tank, and the temperature is maintained at 20~70° C.;
in step (2), the reaction temperature is 20~70° C.;
in step (2), the high gravity rotating bed reactor is selected from RPB high gravity rotating bed reactor, baffled high gravity rotating bed reactor, spiral channel high gravity rotating bed reactor, rotor-stator high gravity rotating bed reactor or a high gravity rotating bed reactor with rotating disks; the rotor speed of the rotating bed is 300~5000 rpm;
in step (2), the molar velocity ratio of magnesium salt solution to lye solution introduced into the rotating packed bed is 0.2 to 3.5: 1; the magnesium salt solution is introduced into the nozzle of the RPB at a linear velocity of 2~7 m/s, and lye is at 2~8 m/s;
in step (2), in the microchannel reactor, an outer tube and an inner tube constitute a casing tube; an annular space is formed between the inner tube and the outer tube, which constitutes an annular microchannel; the annular microchannel has a radial spacing of 100 μm~5 mm; the outer tube is equipped with continuous phase inlet and outlet; the inner tube is equipped with a dispersion phase inlet at one end and is closed at the other end;
and the closed end is in the shape of cone or bullet; the tube wall of the columnar inner tube adjacent to the closed end is circumferentially covered with micropores having a pore size in the range of 0.05 to 100 μm;

the tube wall of the columnar inner tube has an aperture ratio of 3% to 60%; the micropores on the inner tube are the dispersion phase outlets;

in step (2), the volume flow ratio of the magnesium salt solution to lye introduced into the casing annular microchannel reactor is (0.5~10):1;

in step (2), the flow of the magnesium salt solution introduced into the outer tube of the casing annular microchannel reactor is 1~6 L/min, the flow of the lye introduced into the inner tube of the casing annular microchannel reactor is 0.2~2 L/min;

in step (2), a plurality of casing annular microchannel reactors are connected in parallel;

in step (2), centrifugal pump, peristaltic pump or metering pump provided with a flowmeter is adopted to adjust the injection rate of the reaction solution;

in step (3), the surfactant is selected from one or more of the following substances: cetyl trimethyl ammonium bromide, sodium lauryl sulfate, sodium oleate, polyvinylpyrrolidone, polyethylene glycol, γ-aminopropyl triethoxysilane, γ- glycidoxypropyl trimethoxy silane, γ-methacryloxypropyl trimethoxy silane, N-(β-aminoethyl)-γ-aminopropyltrimethoxysilane, N-(β-aminoethyl) -γ-aminopropyltriethoxysilane, N-β-(aminoethyl) -γ-aminopropyl dimethoxy silane, oleic acid, stearic acid, zinc stearate, sodium stearate, titanate and polyvinyl alcohol;

in step (3), the modification is carried out in a modification tank, where the modification temperature is 30~95° C., the modification time is 0.5~5 h;

in step (3), the mass fraction of the surfactant-coated layer accounts for 1%~40% of the modified magnesium hydroxide particles; and in step (3), the standing time is 0.5~5 h.

4. A transparent flame-retardant thermal-insulating UV-blocking composite film according to claim 1, wherein, the thermal insulation functional layer is composed of 5~50 wt % near-infrared absorbing agent or heat shielding agent, 60~80 wt % polymer and 0~35 wt % aid; the thermal insulation functional layer has a thickness of 100 nm~150 μm; the near-infrared absorbing agent or heat shielding agent is selected from one or more of indium tin oxide, tin antimony oxide, tungsten oxide, various tungsten bronzes or lanthanum hexaboride;

the near-infrared absorbing agent or heat shielding agent is cubic, spherical, rod-like, strip-like, needle-like, flake-shaped or sea urchin-shaped; and the polymer of the thermal insulation functional layer is selected from any one of polyvinyl butyral, polyvinyl pyrrolidone, polyacrylate polymer, polysiloxane polymer, polyurethane polymer, polyterephthalate polymer, polystyrene and polycarbonate or the copolymer or blend of more of them.

5. A transparent flame-retardant thermal-insulating UV-blocking composite film according to claim 1, wherein, the UV-blocking functional layer is composed of 4~60 wt % inorganic absorbing agent, 40~96 wt % polymer and 0~30 wt % aid; the UV-blocking functional layer has a thickness of 100 nm~50 μm;

the inorganic UV absorbing agent is selected from one of zinc oxide, titanium dioxide, cerium oxide, doped zinc oxide, doped titanium dioxide and silica-coated core-shell composite metal oxide particle with any one of the zinc oxide, the titanium dioxide, the cerium oxide, the doped zinc oxide and the doped titanium dioxide as the core or the mixture of more of them;

the inorganic UV absorbing agent is cubic, spherical, rod-like, strip-like, needle-like, flake-shaped or sea urchin-shaped; and the polymer of the UV-blocking functional layer is selected from any one of polyvinyl butyral, polyvinyl pyrrolidone, polyacrylate polymer, polysiloxane polymer, polyurethane polymer, polyterephthalate polymer, polystyrene and polycarbonate or the copolymer or blend of more of them.

6. A transparent flame-retardant thermal-insulating UV-blocking composite film according to claim 1, wherein, the aid is selected from one or more of diethyl phthalate, dioctyl phthalate, dibutyl phthalate, tributyl phosphate, triphenyl phosphate, tricresyl phosphate, dibutyl sebacate, acrylate copolymer, a non-reactive modified polysiloxane, leveling agent H88, ethylene glycol butyl ether, diethylene glycol di-n-butyl ether, polyether-modified polysiloxane wetting agent, organosilicone defoamer, polyether defoamer, polyvinylpyrrolidone, various types of ionic surfactants, fatty alcohol polyoxyethylene ether, steartrimonium chloride, N, N-bihydroxyethyl-N-(3 'dodecyloxy-2'-hydroxypropyl) methylamine methyl sulfate, stearamidopropyl-β-ethoxyl-dimethyl ammonium nitrate, stearhydroxylamine propyl-β-hydroxyethyl-dimethyl triammonium hydrogen phosphate, ethyoxyl lauramide, glycerine-stearate, sodium dithiocarbamate, and sodium dodecyl sulfonate.

7. A method for preparing a transparent flame-retardant thermal-insulating UV-blocking composite film according to claim 1, wherein: comprising the following preparation steps:

(1) dispersing the functional particles of each functional layer into a proper dispersion medium to form a uniform transparent dispersion; uniformly mixing the transparent dispersion with polymer and aid or the solution thereof at a certain concentration to give the film-forming primary liquid of each functional layer (2) coating the flame retardant functional layer obtained from step (1) onto the substrate by use of knife coating, transfer printing, spray coating, impregnation, roller painting, spin coating, extrusion molding or calendaring molding; then curing at 80~150° C. or under UV light's irradiation.

(3) coating the film-forming primary liquid of the thermal insulation functional layer obtained from step (1) onto the other side of the substrate in step (2) by use of knife coating, transfer printing, spray coating, impregnation, roller painting, spin coating, extrusion molding or calendaring molding; then curing at 80~150° C. or under UV light's irradiation.

(4) coating the film-forming primary liquid of the UV-blocking functional layer obtained from step (1) onto the thermal insulation functional layer obtained in step (3) by use of knife coating, transfer printing, spray coating, impregnation, roller painting, spin coating, extrusion molding or calendaring molding; then curing at 80~150° C. or under UV light's irradiation to obtain the product a transparent flame-retardant thermal-insulating UV-blocking composite film.

8. A method for preparing a transparent flame-retardant thermal-insulating UV-blocking composite film according to claim 7, wherein: the dispersion medium in step (1) is one of water, methanol, ethanol, n-heptane, n-hexane, cyclohexane, toluene, xylene, ethyl acetate or butyl acetate or a mixture of more of them.

9. A substrate for forming the transparent flame-retardant thermal-insulating UV-blocking composite film according to claim 1, wherein the substrate is formed of a transparent polymer film substrate, which is selected from one of polyethylene terephthalate (PET), polycarbonate (PC), polystyrene (PS), polyethylene (PE), polypropylene (PP) and polyvinyl chloride (PVC).

10. Use of a transparent flame-retardant thermal-insulating UV-blocking composite film according to claim 1, wherein the transparent flame-retardant thermal-insulating UV-blocking composite film provided can be used for such transparent materials and items as glass, windows, protective films, containers and electronic components, and has applications in such fields as construction, transportation, electronics, aerospace and medicine.

11. A transparent flame-retardant thermal-insulating UV-blocking composite film according to claim 1, wherein the polymer of the flame retardant functional layer is polytrimethylene terephthalate.

12. A transparent flame-retardant thermal-insulating UV-blocking composite film according to claim 4, wherein the near-infrared absorbing agent or heat shielding agent is selected from one or more of tungsten oxide and various tungsten bronzes.

13. A transparent flame-retardant thermal-insulating UV-blocking composite film according to claim 4, wherein the near-infrared absorbing agent or heat shielding agent is selected from one or more of potassium tungsten bronze, cesium tungsten bronze, rubidium tungsten bronze, potassium cesium tungsten bronze, ammonium tungsten bronze and tungsten oxide.

14. A transparent flame-retardant thermal-insulating UV-blocking composite film according to claim 5, wherein the inorganic UV absorbing agent is silica-coated zinc oxide.

* * * * *